(12) United States Patent
Park

(10) Patent No.: US 8,471,989 B2
(45) Date of Patent: Jun. 25, 2013

(54) PIXEL UNIT OF FFS TYPE TFT-LCD ARRAY SUBSTRATE

(75) Inventor: Hanjun Park, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 196 days.

(21) Appl. No.: 12/888,156

(22) Filed: Sep. 22, 2010

(65) Prior Publication Data
US 2011/0075085 A1 Mar. 31, 2011

(30) Foreign Application Priority Data
Sep. 25, 2009 (CN) .......................... 2009 1 0093192

(51) Int. Cl.
*G02F 1/1337* (2006.01)
(52) U.S. Cl.
USPC .......................................................... 349/129
(58) Field of Classification Search
USPC .......................................................... 349/129
See application file for complete search history.

(56) References Cited

U.S. PATENT DOCUMENTS
2006/0146243 A1 * 7/2006 Nakanishi et al. ............ 349/139
2008/0002122 A1 1/2008 Song et al.

FOREIGN PATENT DOCUMENTS
CN 101097307 A 1/2008

* cited by examiner

*Primary Examiner* — Phu Vu
(74) *Attorney, Agent, or Firm* — Ladas & Parry LLP

(57) ABSTRACT

A pixel unit of an FFS type TFT-LCD array substrate comprises a slit electrode. The slit electrode comprises at least one slit unit, a direction from one side of the slit unit to the opposite side of the slit unit is defined as a first direction, the slit unit comprises a plurality of slits, extending in a same direction and arranged along the first direction, and electrode parts between two adjacent slits. The sum of the width of each electrode part and the width of a slit adjacent to the electrode part at a side in the first direction increases gradually along the first direction.

13 Claims, 3 Drawing Sheets

US 8,471,989 B2

PIXEL UNIT OF FFS TYPE TFT-LCD ARRAY SUBSTRATE

BACKGROUND OF THE INVENTION

Embodiments of the invention relate to a pixel unit of a fringe field switch (FFS) type thin film transistor liquid crystal display (TFT-LCD) array substrate.

TFT-LCDs have been an important type of flat panel displays (FPDs). TFT-LCDs can be classified into a vertical electrical field type and a horizontal electrical field type depending on the direction of the electrical field by which liquid crystal is driven. For a vertical electrical field type TFT-LCD, a pixel electrode is formed on an array substrate while a common electrode is formed on a color filter substrate. For a horizontal electrical field type TFT-LCD, both a pixel electrode and a common electrode are formed on an array substrate. Therefore, an additional patterning process for forming the common electrode is required when a horizontal electrical filed type TFT-LCD array substrate is manufactured. A vertical electrical field type TFT-LCD comprises a twist nematic (TN) type TFT-LCD. A horizontal electrical field type TFT-LCD comprises a fringe field switching (FFS) type TFT-LCD and an in-plane switching (IPS) type TFT-LCD. A horizontal electrical field type TFT-LCD, especially an FFS type TFT-LCD, has advantages such as wide view angles and high aperture ratio and have been widely used in the liquid crystal display filed.

There are various kinds of FFS type TFT-LCDs; however, these different kinds of FFS type TFT-LCD have a common point: a horizontal electrical field is generated through a plate electrode and a slit electrode. The positions of the plate electrode and the slit electrode may be different. The plate electrode may be a common electrode or a pixel electrode, and the slit electrode may also be a common electrode or a pixel electrode accordingly.

FIGS. 1 and 2 are schematic plan views of a conventional slit electrode. FIG. 1 shows an alignment of liquid crystal when no voltage is applied. FIG. 2 shows an alignment of liquid crystal after a driving voltage is applied. As shown in FIGS. 1 and 2, for the conventional slit electrode, the sum of the width W of an electrode parts 12' between two slits 11' and the width L of the slits 11' adjacent to the electrode part 12' has a constant value. The rotation of liquid crystal molecules is affected by the driving voltage and the value of W+L. Since the value of W+L for the conventional slit electrode is a constant value across the electrode, the liquid crystal molecules driven by the applied driving voltage will have the same rotation degree across a pixel unit.

The optical characteristics of liquid crystal molecule render the light refractive index different when viewed from various view angles. When the view angle is switched from the front to one side of a liquid crystal display panel, i.e., the incident angle of the light is changed, the light refractive index difference of liquid crystal becomes more and more notable. Since each liquid crystal molecule has the same rotation degree, the light refractive index at a certain view angle is the same. Therefore, since the average light refractive index of liquid crystal varies to a relatively large degree for the whole panel, the image quality becomes different when the image is viewed from the front and from the side.

In the conventional liquid crystal display, the image quality various notably when viewed from different view angles, which leads to the users' dissatisfaction with the product performance.

SUMMARY

An embodiment of the invention provides a pixel unit of an FFS type TFT-LCD array substrate comprises a slit electrode. The slit electrode comprises at least one slit unit, a direction from one side of the slit unit to the opposite side of the slit unit is defined as a first direction, the slit unit comprises a plurality of slits, extending in a same direction and arranged along the first direction, and electrode parts between two adjacent slits. The sum of the width of each electrode part and the width of a slit adjacent to the electrode part at a side in the first direction increases gradually along the first direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Hereinafter, the embodiments of the invention will be further described with reference to the accompanying drawings.

Figure 1:
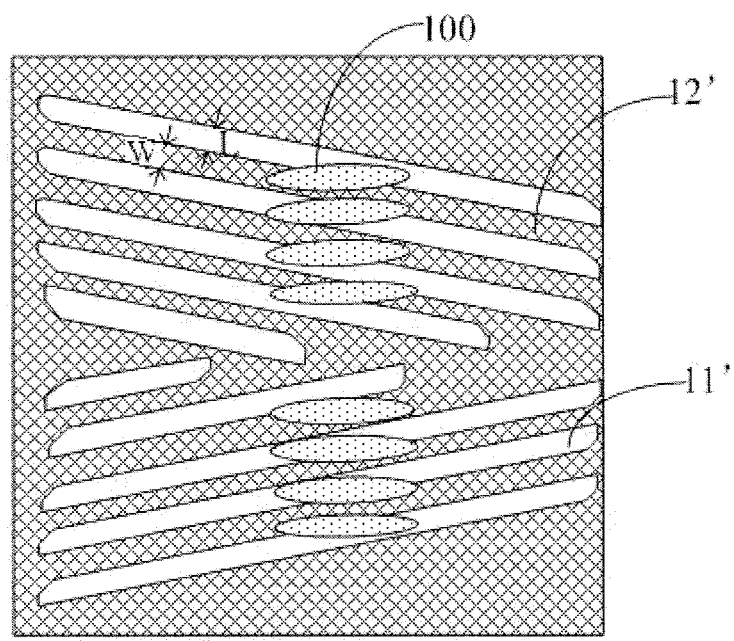
FIGS. 1 and 2 is schematic plan views for a slit electrode in the prior art.
Figure 2:
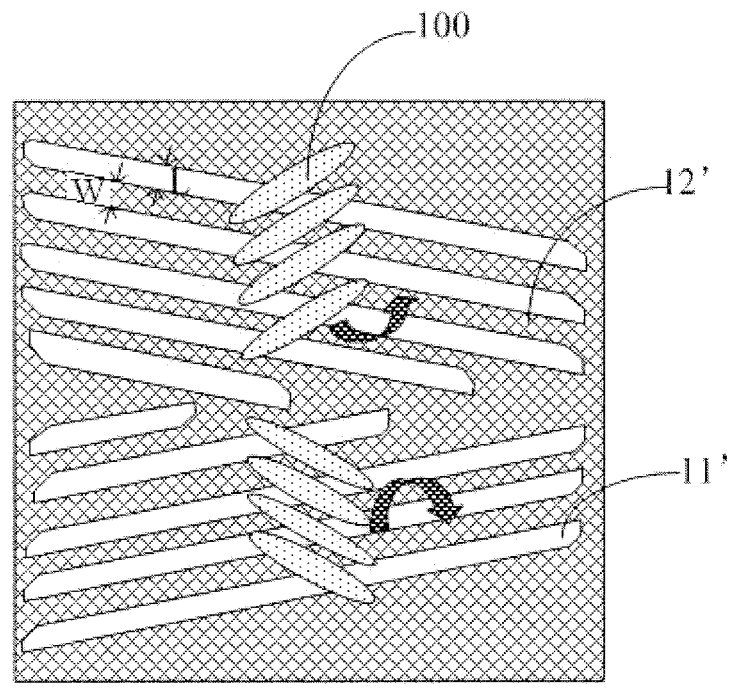
Figure 3:
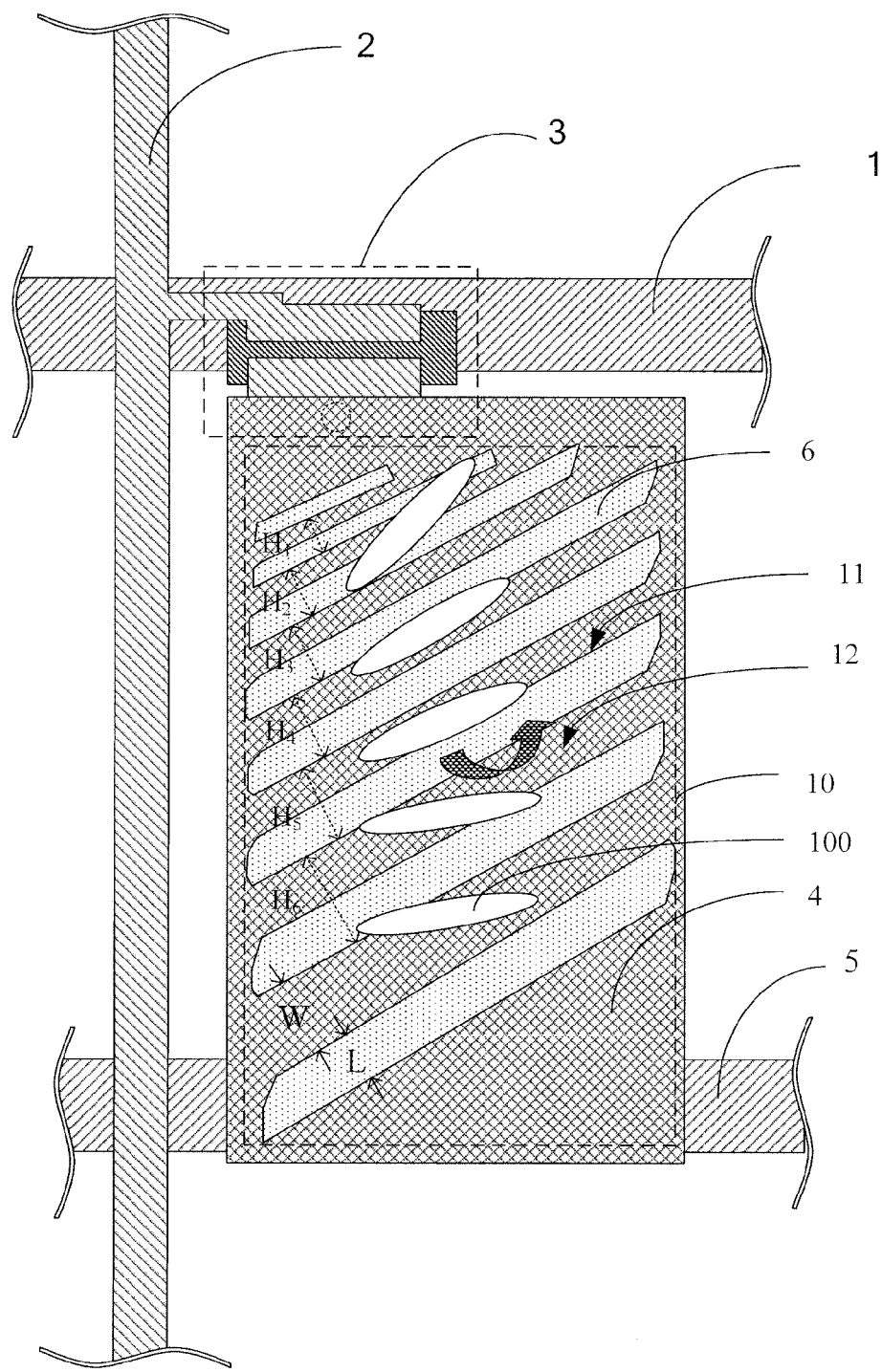
FIG. 3 is a schematic plan view for a pixel unit of an FFS type TFT-LCD array substrate according to an embodiment of the invention.

FIG. 3 is a schematic plan view for a pixel unit of an FFS type TFT-LCD array substrate according to an embodiment. As shown in FIG. 3, the FFS type TFT-LCD array substrate comprises a plurality of pixel units. Each pixel unit comprises a transparent substrate, a gate line 1, a data line 2, a thin film transistor (TFT) 3, a pixel electrode 4, a common electrode line 5 and a common electrode 6. The gate line 1 and the common electrode line 5 are provided on the transparent substrate transversely, and the data line 2 is provided on the transparent substrate longitudinally. The TFT 3 is provided at the intersection between the gate line 1 and the data line 2. The TFT 3 is an active switch element for controlling the pixel electrode 4.

In FIG. 3, the pixel electrode 4 is a slit electrode, and the common electrode 6 is a plate electrode. The common electrode 6 is located above the pixel electrode 4, and most parts of them are overlapped with each other. A dielectric layer is provided between the electrodes 6 and 4. The common electrode 6 and the pixel electrode 4 form an electrode field for driving the liquid crystal when applied a voltage across them. The common electrode line 5 is connected with the common electrode 6 for providing a common voltage. It should be noted that, the reference number "6" does not indicate the strip-like slit in the drawing, but the underlying plate common electrode exposed by the slit.

The pixel electrode in FIG. 3, i.e., the slit electrode, comprises at least one slit unit 10. Only one slit unit 10 is provided in FIG. 3 for the purpose of illustration. The slit unit 10 comprises a plurality of slits, which extend in the same direction, for example in parallel with each other, and are arranged along an approximately up-down direction in the drawing, and electrode parts 12 between two adjacent slits 11. Here the up-down direction is an example of a first direction. The sum of the width W of each electrode part 12 and the width L of a slit 11 adjacent to the electrode part at the upper side thereof increases gradually from $H_1$ at the upper most side to $H_6$ at the lower most side. It is preferably that the value $H_1$ minus $H_6$ ($H_1$-$H_6$) increases gradually within a range of 1-30 μm.

FIG. 3 also shows the alignment of liquid crystal molecules 100 after applied a driving voltage thereto. Since all the liquid crystal molecules in one pixel electrode are driven by a driving voltage, W+L affects the rotation degree of the liquid crystal molecules 100. In FIG. 3, the rotation degree of the liquid crystal molecules 100 within a pixel electrode increases gradually from the lower side to the upper side. Therefore, in one pixel unit, the refractive indexes for each liquid crystal molecule 100 at a certain view angle (i.e., light has the same incident angle) are different, and the average refractive index between different view angles is reduced as a whole. In this end, when users watch from different view angles, the display difference will not be notable, and the color and grey variations over view angles are alleviated, which increases users' satisfaction with the product.

Although FIG. 3 only shows the case in which W+L increases gradually from the upper side to the lower side, those skilled in the art can understand, according to the teaching of the embodiment, that the case in which W+L decreases gradually from the upper side to the lower side can also obtain the same technical effect, which is not described repeatedly. The gradual increase in the sum of the widths of the slit and the electrode part can be implemented in the cases in which the widths of the slits increase gradually while the width of the electrode parts keeps constant, the widths of the electrode parts increase gradually while the widths of the silts keeps constant, and the widths of both the slits and the electrode parts increases gradually. Moreover, it can be ensured that the gradual increase in the sum of the width W of each electrode part and the width L of a slit adjacent to the electrode part at the upper side thereof also means that the distance between the centers of the width of the adjacent slits increase gradually from the upper side to the lower side.

FIG. 3 shows an example in which the slits are provided on the pixel electrode; however, the slit structure can also be applied to the common electrode with slits. In this example, the common electrode is applied a constant voltage; therefore, the same effect as that in the above embodiment also can be obtained by changing the value of W+L.

Figure 4:
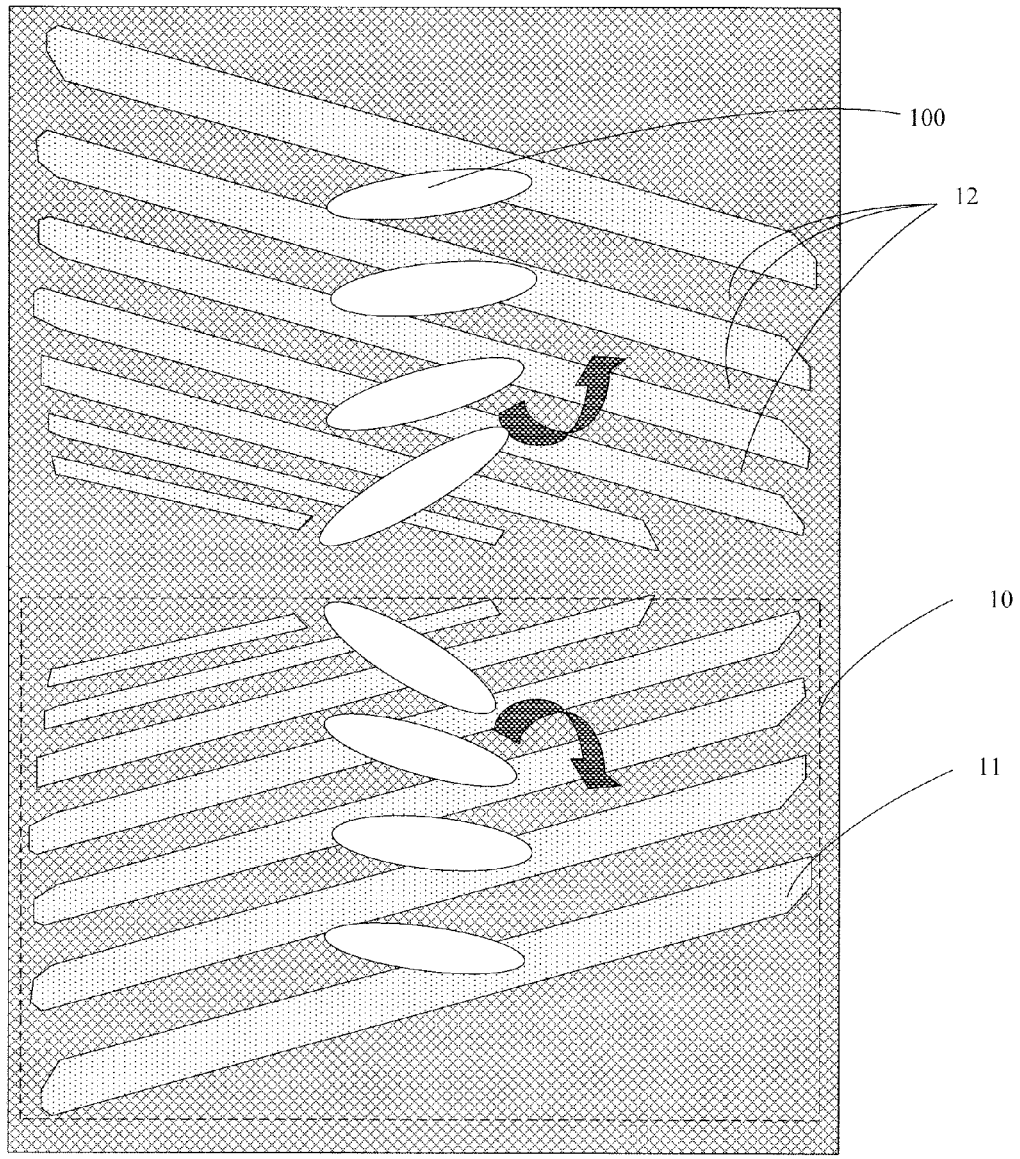
FIG. 4 is a plan view of a slit electrode according to another embodiment of the invention.

FIG. 4 is a schematic plan view showing a slit electrode according to another embodiment, and FIG. 4 shows the alignment of liquid crystal after a certain signal is given and an electrical field is formed. As shown in FIG. 4, the slit electrode according to the embodiment has two slit units 10 which are provided symmetrically with each other with respect to a straight line in the horizontal direction, compared with the embodiment shown in FIG. 3. Each slit unit 10 comprises a plurality of slits 11 and electrode parts 10 between two adjacent slits 11. In the embodiment, W+L in each slit unit increases gradually as that shown in FIG. 3, preferably with a range of 1-30 μm. The rotation of liquid crystal after giving a driving voltage is shown in FIG. 4.

In one pixel unit, the refractive indexes for liquid crystal molecules 100 at a certain view angle (i.e., light incident angle is the same) are different from each other, reducing the average refractive index difference between different view angles as a whole. Therefore, when an image is viewed from different view angles by users, there is no notable display difference, and the color and grey variations is alleviated over view angles, which increases the users' satisfaction with the product.

The above embodiments only show the slit structure extending along a straight line, however, it should be noted that the slits and electrode parts may also be of a bend shape or any other shapes, as long as the sum of the widths of the slit and the adjacent electrode part has represented the above variation. Also, it should be noted that, in the above description, the expressions such as "up," "down" and the like are used to illustrate only but do not mean the absolute direction.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A pixel unit of a fringe field switch (FFS) type thin film transistor liquid crystal display (TFT-LCD) array substrate, comprising a slit electrode, wherein the slit electrode comprises at least one slit unit, a direction from one side of the slit unit to the opposite side of the slit unit is defined as a first direction, the slit unit comprises a plurality of slits, extending in a same direction and arranged along the first direction, and electrode parts each between two adjacent slits, the slits are separate from one another, and the electrode parts each between two adjacent slits are connected with one another at ends, and wherein the sum of the width of each electrode part and the width of a slit adjacent to the electrode part at a side in the first direction increases gradually along the first direction.

2. The pixel unit of the FFS type TFT-LCD array substrate of claim 1, wherein the sum of the width of each electrode part and the width of the slit adjacent to the electrode part at a side in the first direction is in a range of 1-30 μm.

3. The pixel unit of the FFS type TFT-LCD array substrate of claim 1, wherein the slit electrode comprises two slit units, and the two slit units are provide symmetrically with each other with respect to a straight line.

4. The pixel unit of the FFS type TFT-LCD array substrate of claim 1, wherein the slit electrode is a pixel electrode.

5. A pixel unit of a fringe field switch (FFS) type thin film transistor liquid crystal display (TFT-LCD) array substrate, comprising a slit electrode, wherein the slit electrode is a pixel electrode, wherein the slit electrode comprises at least one slit unit, a direction from one side of the slit unit to the opposite side of the slit unit is defined as a first direction, the slit unit comprises a plurality of slits, extending in a same direction and arranged along the first direction, and electrode parts between two adjacent slits, and wherein the sum of the width of each electrode part and the width of a slit adjacent to the electrode part at a side in the first direction increases gradually along the first direction, wherein the array substrate further comprises a common electrode, and the common electrode is a plate electrode.

6. A pixel unit of a fringe field switch (FFS) type thin film transistor liquid crystal display (TFT-LCD) array substrate, comprising a slit electrode, wherein the slit electrode comprises at least one slit unit, a direction from one side of the slit unit to the opposite side of the slit unit is defined as a first direction, the slit unit comprises a plurality of slits, extending in a same direction and arranged along the first direction, and electrode parts between two adjacent slits, and
wherein the sum of the width of each electrode part and the width of a slit adjacent to the electrode part at a side in the first direction increases gradually along the first direction, wherein the slit electrode is a common electrode.

7. The pixel unit of the FFS type TFT-LCD array substrate of claim 6, wherein the array substrate further comprises a pixel electrode, and the pixel electrode is a plate electrode.

8. The pixel unit of the FFS type TFT-LCD array substrate of claim 1, wherein the width of each slit increases gradually along the first direction.

9. The pixel unit of the FFS type TFT-LCD array substrate of claim 1, wherein the width of each electrode part increases gradually along the first direction.

10. The pixel unit of the FFS type TFT-LCD array substrate of claim 9, wherein the width of each slit increase gradually along the first direction.

11. The pixel unit of the FFS type TFT-LCD array substrate of claim 4, wherein the array substrate further comprises a common electrode, and the common electrode is a plate electrode.

12. The pixel unit of the FFS type TFT-LCD array substrate of claim 1, wherein the slit electrode is a common electrode.

13. The pixel unit of the FFS type TFT-LCD array substrate of claim 12, wherein the array substrate further comprises a pixel electrode, and the pixel electrode is a plate electrode.

* * * * *